(12) United States Patent
Hundley et al.

(10) Patent No.: US 11,806,956 B1
(45) Date of Patent: Nov. 7, 2023

(54) METHOD OF REPAIRING SANDWICH STRUCTURE

(71) Applicant: HRL LABORATORIES, LLC, Malibu, CA (US)

(72) Inventors: Jacob M. Hundley, Newbury Park, CA (US); Eric C. Clough, Santa Monica, CA (US); Zak C. Eckel, Calabasas, CA (US); David Page, Malibu, CA (US); Sophia S. Yang, Los Angeles, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 13 days.

(21) Appl. No.: 17/372,186

(22) Filed: Jul. 9, 2021

Related U.S. Application Data

(60) Division of application No. 16/654,840, filed on Oct. 16, 2019, now Pat. No. 11,148,375, which is a
(Continued)

(51) Int. Cl.
| | |
|---|---|
| *B29C 73/10* | (2006.01) |
| *B64F 5/40* | (2017.01) |
| *B29C 73/02* | (2006.01) |
| *B29C 73/06* | (2006.01) |
| *B23P 6/00* | (2006.01) |
| *B32B 3/12* | (2006.01) |
| *B29L 7/00* | (2006.01) |
| *B64C 1/00* | (2006.01) |

(52) U.S. Cl.
CPC ............. *B29C 73/10* (2013.01); *B23P 6/00* (2013.01); *B29C 73/02* (2013.01); *B29C 73/06* (2013.01); *B64F 5/40* (2017.01); *B29L 2007/002* (2013.01); *B32B 3/12* (2013.01); *B32B 2605/18* (2013.01); *B64C 2001/0072* (2013.01); *F05D 2230/80* (2013.01)

(58) Field of Classification Search
None
See application file for complete search history.

(56) References Cited

U.S. PATENT DOCUMENTS

| | | |
|---|---|---|
| 3,868,297 A | 2/1975 | Jamison |
| 4,018,211 A | 4/1977 | Barr |

(Continued)

FOREIGN PATENT DOCUMENTS

| | | |
|---|---|---|
| WO | WO9630202 A1 | 10/1996 |
| WO | WO0024559 A1 | 5/2000 |

OTHER PUBLICATIONS

Department of Defense Handbook, Composite Materials Handbook, vol. 2, Polymer Matrix Composites Materials Properties, (MIL-17), 529 pages, Jun. 17, 2002.
(Continued)

*Primary Examiner* — Barbara J Musser
(74) *Attorney, Agent, or Firm* — Lewis Roca Rothgerber Christie LLP

(57) ABSTRACT

A method of repairing a sandwich structure includes: removing a damaged portion of a core and a damaged portion of a first facesheet to form an open volume; filling the open volume with an ultraviolet-curable photomonomer; partially curing the ultraviolet-curable photomonomer to form a plurality of photopolymer waveguides by utilizing ultraviolet light; and arranging a replacement facesheet on the damaged portion of the first facesheet and over the photopolymer waveguides.

7 Claims, 8 Drawing Sheets

Related U.S. Application Data continuation-in-part of application No. 15/690,229, filed on Aug. 29, 2017, now Pat. No. 10,946,600.

(60) Provisional application No. 62/772,507, filed on Nov. 28, 2018.

(56) References Cited

U.S. PATENT DOCUMENTS

| | | | |
|---|---|---|---|
| 4,855,182 | A | 8/1989 | Ondrejas et al. |
| 6,450,450 | B1 | 9/2002 | Macdonald |
| 6,739,104 | B2 | 5/2004 | Tokonabe |
| 7,382,959 | B1 | 6/2008 | Jacobsen |
| 7,653,279 | B1 | 1/2010 | Jacobsen |
| 7,658,810 | B2 | 2/2010 | Endres |
| 8,696,843 | B1 | 4/2014 | Dean |
| 9,034,563 | B2 | 5/2015 | Schmaelzle et al. |
| 10,946,600 | B1 | 3/2021 | Hundley et al. |
| 2003/0087049 | A1 | 5/2003 | Hachenberg et al. |
| 2004/0028877 | A1 | 2/2004 | Itoh et al. |
| 2006/0113131 | A1 | 6/2006 | Kato |
| 2010/0159294 | A1 | 6/2010 | Fly |
| 2010/0159303 | A1 | 6/2010 | Rock |
| 2010/0266808 | A1 | 10/2010 | Klein |
| 2011/0039190 | A1 | 2/2011 | Owejan |
| 2011/0229823 | A1 | 9/2011 | Rock |
| 2011/0287190 | A1 | 11/2011 | Bulluck |
| 2012/0315429 | A1 | 12/2012 | Stamp |
| 2014/0120298 | A1 | 5/2014 | Thiagarajan et al. |
| 2014/0252674 | A1 | 9/2014 | Hundley et al. |
| 2014/0295123 | A1 | 10/2014 | Mizuno et al. |
| 2014/0329043 | A1 | 11/2014 | Shigetomi |
| 2015/0090392 | A1 | 4/2015 | Bertrand et al. |
| 2015/0273761 | A1 | 10/2015 | Safai et al. |
| 2015/0307044 | A1 | 10/2015 | Hundley et al. |

OTHER PUBLICATIONS

Fogarty, "Honeycomb Core and the Myths of Moisture Ingression", Appl Compos Mater (2010) 17:293-307, 2009.

Hexcel Composites, "Composites Repair", Apr. 1999, pp. 1-13, Publication No. UTC 102.

Lee et al., "Novel applications of composite structures to robots, machine tools and automobiles", Composite Structures 66, pp. 17-39, 2004.

Schultz et al., "Compression Behavior of Fluted-Core Composite Panels", AIAA Structures, Structural Dynamics and Materials Conference, Apr. 2011, 16 pages.

Wing et al., "Evaluation of Out of Autoclave Composite Properties Manufactured From a Soluble Self-Pressurizing Tooling", SAMP Technical Conference, 203, 9 pages.

Yuan et al., "Experimental Investigation on the Co-Cure Processing of Honeycomb Structure with Self-Adhesive Prepreg", Appl. Comps. Mater., 15:47-59, 2008.

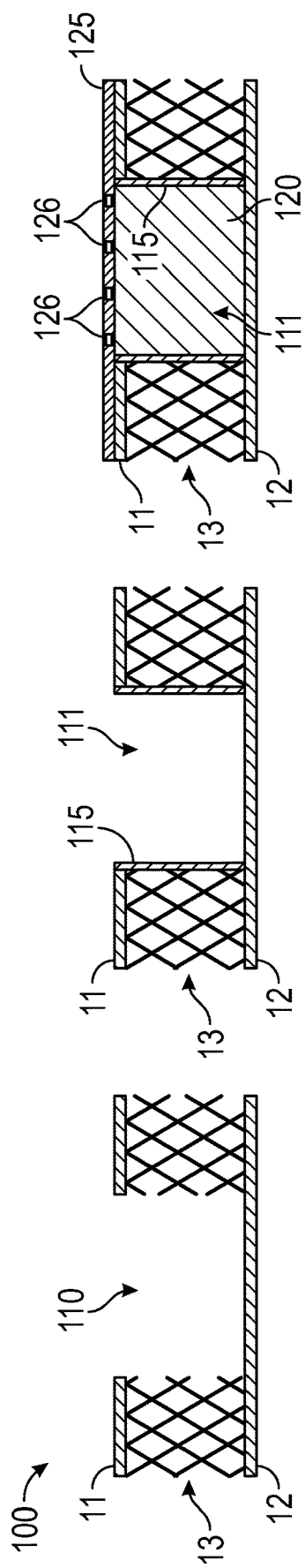

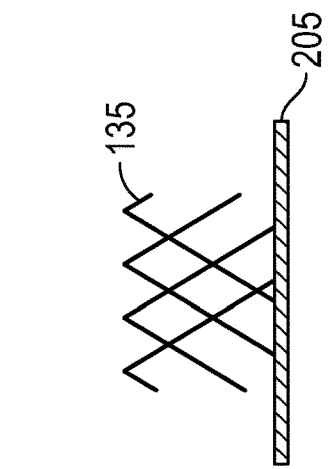
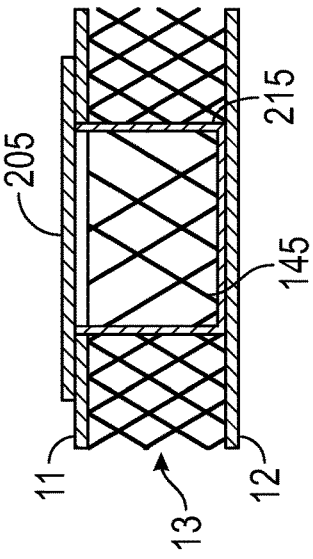
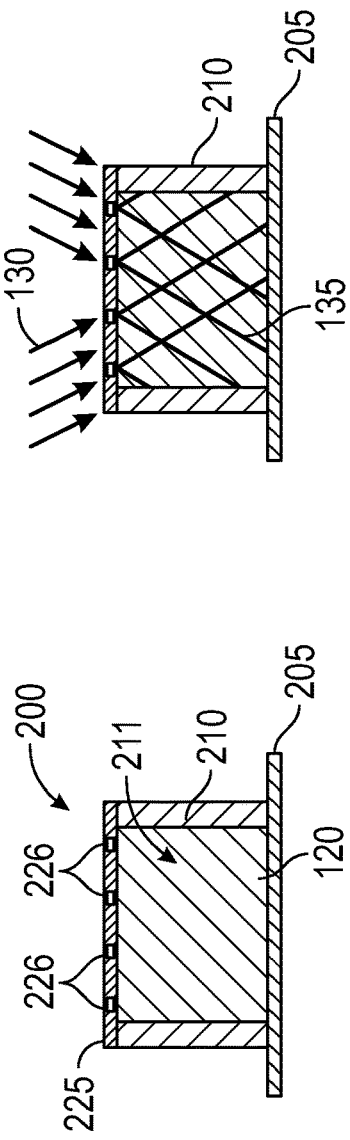
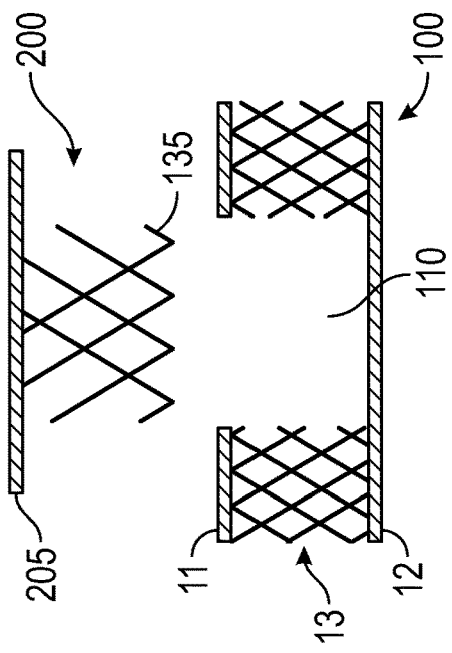
FIG. 5A  FIG. 5B  FIG. 5C  FIG. 5D  FIG. 5E

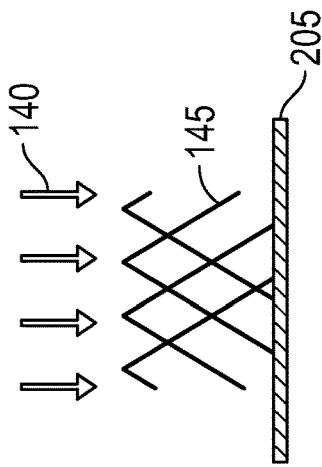
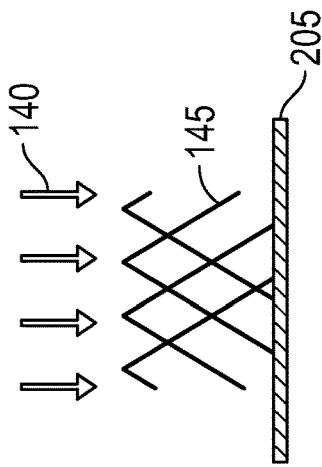
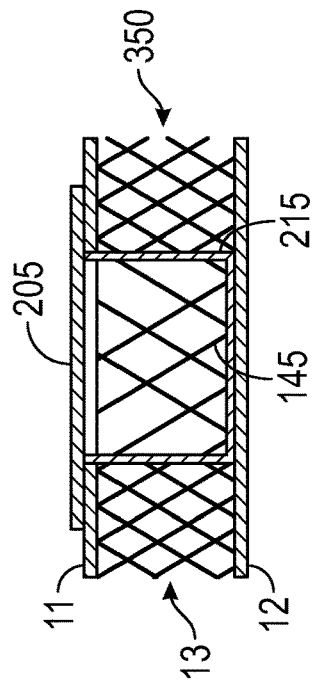
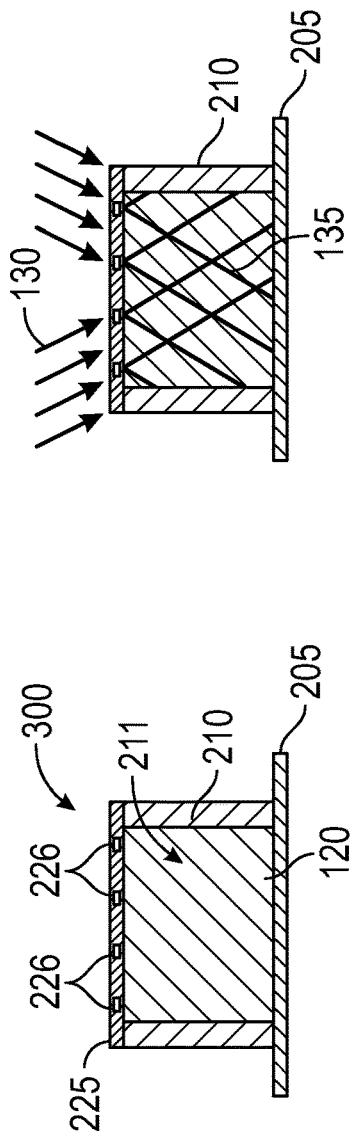
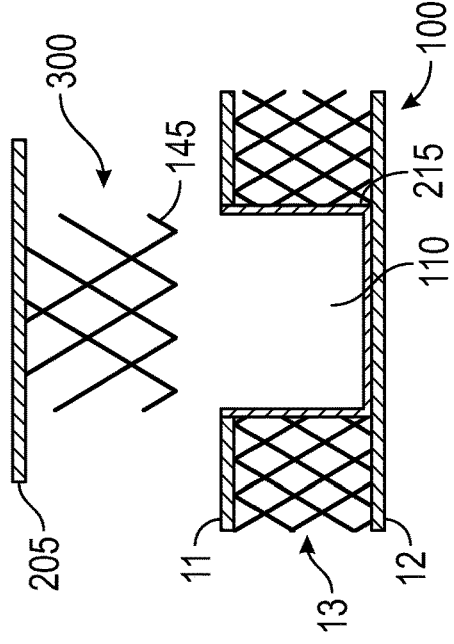

METHOD OF REPAIRING SANDWICH STRUCTURE

CROSS-REFERENCE TO RELATED APPLICATION

The present application is a divisional of U.S. patent application Ser. No. 16/654,840, filed on Oct. 16, 2019, now U.S. Pat. No. 11,148,375, which is a continuation-in-part of U.S. Non-Provisional patent application Ser. No. 15/690,229, filed on Aug. 29, 2017, now U.S. Pat. No. 10,946,600, and claims priority to and the benefit of U.S. Provisional Patent Application Ser. No. 62/772,507, filed on Nov. 28, 2018, the entire content of all of which is incorporated herein by reference. The present application is related to U.S. Non-Provisional patent Nos. 14/197,043 and 15/967,037, filed on Mar. 4, 2014 and Apr. 30, 2018, respectively.

BACKGROUND

1. Field

Aspects of embodiments of the present disclosure relate to a method of repairing a sandwich structure and a repaired sandwich structure.

2. Description of Related Art

Referring to FIG. 1, a sandwich structure 10 includes two relatively thin, lightweight facesheets 11/12 (e.g., a first or upper facesheet 11 and a second or lower facesheet 12) connected to (e.g., bonded to) each other by a relatively low-density reinforcing core 13 between the facesheets 11/12. The sandwich structure 10 provides flexural and torsional rigidity similar to related-art stiffened plate designs while providing a substantial mass reduction compared to the related-art stiffened plate designs. In the sandwich structure 10, the facesheets 11/12 bear in-plane loads while the core 13 carries the shear loads and increases the effective moment of inertia of the sandwich structure 10, similar to an I-beam design in which the flanges and web are replaced by the facesheets 11/12 and core 13, respectively.

Given their relatively lightweight but structurally-efficient characteristics, sandwich structures have been used in a variety of aerospace and automotive applications. Because sandwich structures are often used to form external surfaces, such as aircraft outer mold lines (OML), wing tips, rotor blades, automotive body panels, etc., the sandwich structures may sustain damage to either one of or both of the facesheets 11/12 and/or to the core 13 during their operational lifetime. FIG. 2A shows an example of the sandwich structure 10 with damage to the first facesheet 11 and to the core 13, and FIG. 2B shows an example of the sandwich structure 10 with damage to both the first and second facesheets 11/12 and to the core 13. Such unintentional damage to the sandwich structure 10 may occur during, for example, inspection or maintenance procedures, such as by tool drops, over-torqued fasteners, etc., or during use by, for example, foreign object strikes and the like.

Because the components which include (or which are formed by) the sandwich structure 10 may be relatively complex and expensive, there is a need to efficiently and safely repair the sandwich structure 10 when it has sustained damage without having to replace the entire component. Further, it is important that the repaired sandwich structures have suitable residual load carrying capability to ensure adequate performance of the repaired component.

One related-art method of repairing sandwich structures generally includes excising (e.g., removing) the damaged section of the sandwich structure followed by bonding an undamaged, pre-formed replacement core section of honeycomb or foam materials into the open volume previously occupied by the damaged core and adhering the replacement core section to the surrounding undamaged core section. For ease of repair, a rectangular area larger than the damaged area may be excised from the sandwich structure to make pre-forming the replacement core section easier, but by removing some of the undamaged core along with the damaged core, the sandwich structure is further weakened.

This related-art method may be referred to as the "drill and fill" approach. In the "drill and fill" approach, the pre-formed replacement core section simply fills the previously damaged volume and has minimal ability to transfer shear or in-plane loads to the surrounding, original core structure. For example, the adhesive between the replacement and undamaged core sections carries the shear and in-plane loads between these core sections, and even when high-performance structural adhesives are used, the adhesive interface is significantly less stiff and weaker than the undamaged core. Further, when a thermally-cured adhesive is used, generally, the entire component must be brought up to the raised temperature, which may not be suitable or feasible for parts having a visible surface finish (e.g., automotive panels) or relatively large components (e.g., rotor blades). Thus, while this related-art method may slightly improve the load carrying capability of the sandwich structure over its load carrying capability in the damaged state, the sandwich structure repaired by this related-art method does not approach the load carrying capability of the original, undamaged sandwich structure due to the substantial lack of load transfer between the undamaged core and the repaired core sections.

SUMMARY

Aspects of embodiments of the present disclosure are directed to a method of repairing a sandwich structure and a repaired sandwich structure. A damaged sandwich structure, including a two facesheets and a core, may be repaired by removing the damaged core and facesheet, forming, in situ, a truss to replace the damaged core section, and then placing a replacement facesheet over the truss. For example, a sealed repair volume may be formed in the damaged sandwich structure between the undamaged facesheet (or the previously-repaired facesheet in the case of double-sided damage) and the undamaged core, the sealed repair volume may be filled by a UV-curable photomonomer, and the photomonomer may be cured to form a plurality of photopolymer waveguides. By forming the photopolymer waveguides in the sealed repair volume, the waveguides substantially or entirely fill the sealed repair volume and, therefore, better transfer loads to and from the undamaged core. For example, no adhesive may be necessary between the photopolymer waveguides and the undamaged core because the photopolymer waveguides are cured in place (in situ), thereby they are joined to the undamaged core as a function of being cured in contact with the undamaged core. Therefore, the repaired sandwich structure may have substantially the same load-bearing capacity as an undamaged sandwich structure, allowing components formed of sandwich structures to be repaired and returned to service without needing to be entirely replaced.

According to an embodiment of the present disclosure, a method of repairing a sandwich structure includes: removing a damaged portion of a core and a damaged portion of a first facesheet to form an open volume; filling the open volume with an ultraviolet-curable photomonomer; partially curing the ultraviolet-curable photomonomer to form a plurality of photopolymer waveguides by utilizing ultraviolet light; and arranging a replacement facesheet on the damaged portion of the first facesheet and over the photopolymer waveguides.

The method may further include: sealing the open volume with a sealant to form a sealed repair volume; and filling the sealed repair volume with the ultraviolet-curable photomonomer.

The sealant may include a polymer film, a metal foil, and/or a composite ply.

The sealant may be sealed to a second facesheet by an ultraviolet-curable resin, a film adhesive, and/or a liquid adhesive.

The method may further include placing a mask over the ultraviolet-curable photomonomer in the sealed repair volume. The mask may include a plurality of ultraviolet-transparent apertures.

The partial curing of the ultraviolet-curable photomonomer may include exposing a plurality of ultraviolet light sources to the ultraviolet-curable photomonomer through the ultraviolet-transparent apertures of the mask to form the plurality of photopolymer waveguides.

The method may further include removing the mask after the partial curing of the ultraviolet-curable photomonomer.

The method may further include removing uncured ultraviolet-curable photomonomer from the sealed repair volume.

The method may further include thermally curing the photopolymer waveguides.

The method may further include curing the photopolymer waveguides by exposing the photopolymer waveguides to non-collimated ultraviolet light.

The method may further include adhering the replacement facesheet to the first facesheet by utilizing an adhesive.

The arranging of the replacement facesheet may include: stacking a plurality of composite plies on the first facesheet and over the photopolymer waveguides; and curing the composite plies by utilizing ultraviolet light and/or heat.

According to an embodiment of the present disclosure, a method of repairing a sandwich structure is provided. The sandwich structure includes a first facesheet, a second facesheet, and a core between the first and second facesheets. The method includes: forming a repair volume in the sandwich structure by removing a damaged portion of the first facesheet and a damaged portion of the core; forming a mold on a replacement facesheet, the mold and the replacement facesheet forming an open volume; filling the open volume with an ultraviolet-curable photomonomer; forming a plurality of photopolymer waveguides by partially curing the ultraviolet-curable photomonomer; and inserting the photopolymer waveguides into the repair volume in the sandwich structure.

The method may further include arranging a mask on an upper surface of the mold and over the ultraviolet-curable photomonomer. The mask may include a plurality of ultraviolet-transparent apertures, and the forming of the photopolymer waveguides may include exposing collimated ultraviolet light through the ultraviolet-transparent apertures in the mask.

The may further include curing the photopolymer waveguides after the inserting of the photopolymer waveguides into the repair volume.

The curing of the photopolymer waveguides may include thermally curing the photopolymer waveguides.

The method may further include curing the photopolymer waveguides before the inserting of the photopolymer waveguides into the repair volume.

The curing of the photopolymer waveguides may include exposing the photopolymer waveguides to non-collimated ultraviolet light.

The method may further include adhering the replacement facesheet to the first facesheet.

According to an embodiment of the present disclosure, a repaired sandwich structure includes: a first facesheet having an opening therein; a replacement facesheet covering the opening in the first facesheet; a second facesheet opposite the first facesheet and the replacement facesheet; and a microtruss core between the first and second facesheets and having a repair volume portion. The repair volume portion of the microtruss core is aligned with the opening in the first facesheet and has a different arrangement of microtrusses than an adjacent volume portion of the microtruss core.

BRIEF DESCRIPTION OF THE DRAWINGS

FIGS. 3A-3F show a method of repairing a damaged sandwich structure according to an embodiment of the present disclosure;

FIGS. 5A-5E show a method of repairing a damaged sandwich structure according to another embodiment of the present disclosure;

FIGS. 6A-6E show a method of repairing a damaged sandwich structure according to another embodiment of the present disclosure;

DETAILED DESCRIPTION

The detailed description set forth below in connection with the appended drawings is intended as a description of example embodiments of the present disclosure and is not intended to represent the only forms in which the present disclosure may be embodied. The description sets forth aspects and features of the present disclosure in connection with the illustrated embodiments. It is to be understood, however, that the same or equivalent aspects and features may be accomplished by different embodiments, and such other embodiments are encompassed within the spirit and scope of the present disclosure. As noted elsewhere herein, like element numbers in the description and the drawings are intended to indicate like elements. Further, descriptions of features, configurations, and/or other aspects within each embodiment should typically be considered as available for other similar features, configurations, and/or aspects in other embodiments.

According to embodiments of the present disclosure, the reinforcing core (e.g., the core) 13 of the sandwich structure 10 may be a cellular core, such as a three-dimensional truss or lattice architecture (e.g., a microtruss) formed by a plurality of interconnecting photopolymer waveguides (e.g., self-propagating photopolymer waveguides). This may be referred to as a microtruss core 13 herein. The present disclosure, however, is not limited thereto, and in other embodiments, the core 13 may include a truss or lattice architecture including a different material, such as a thermoplastic polymer, a thermosetting polymer, metal, ceramic, and/or a composite or hybrid material, or may be a commercially available cellular material, such as a honeycomb, open cell foam, or closed cell foam.

The facesheets 11/12 may be (or may include) a carbon fiber reinforced polymer ("CFRP"), a glass fiber reinforced polymer ("GFRP"), a composite material, or a metal, such as aluminum.

Figure 1:
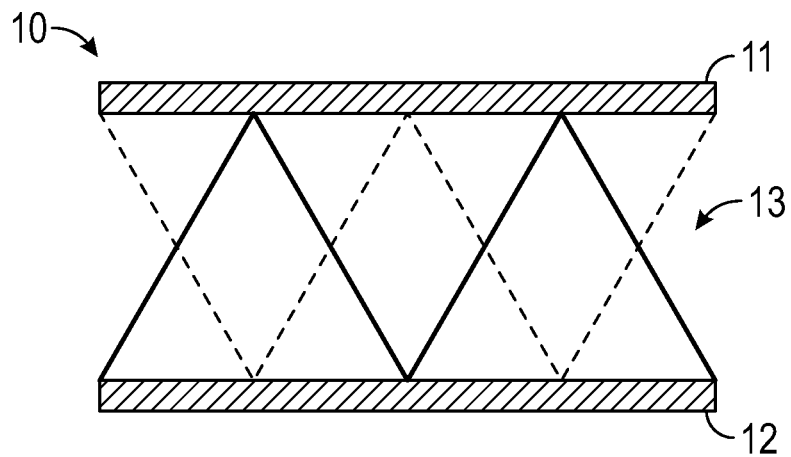
FIG. 1 is a cross-sectional view of a sandwich structure according to the related art.
Figure 2A:
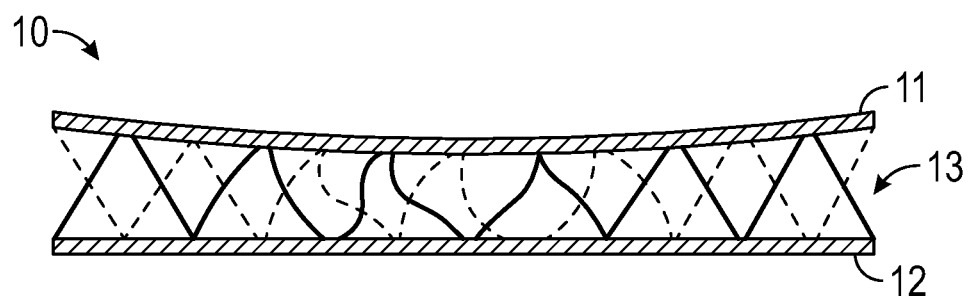
FIGS. 2A and 2B are cross-sectional views of the sandwich structure shown in FIG. 1 having sustained single-sided damage and double-sided damage, respectively.
Figure 2B:
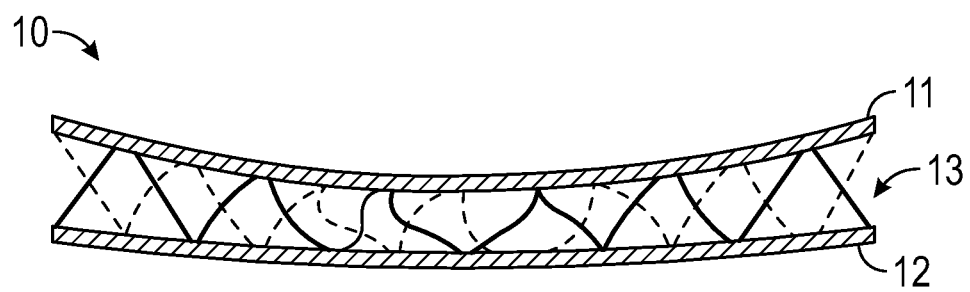

Throughout this document, "damage" may refer to inelastic deformation of the sandwich structure causing a loss in its residual static or dynamic load-carrying capability. Such damage may occur as a result of normal operation, hygrothermal conditioning, low- or high-velocity impacts, manufacturing defects, etc. Damage to the sandwich structure may be single-sided damage, in which one of the facesheets 11 and the core 13 are damaged (see, e.g., FIG. 2A), or double-sided damage, in which both of the facesheets 11/12 and the core 13 are damaged (see, e.g., FIG. 2B). In some instances, only the core 13 is damaged and the facesheets 11/12 are not damaged, which may be the result of a manufacturing defect, for example. This damage may be considered single-sided damage for the purposes of this document.

Referring to FIGS. 3A-3F, a method of repairing single-sided damage to a sandwich structure 100 according to an embodiment of the present disclosure is illustrated.

Referring to FIG. 3A, the damaged section of the first facesheet 11 and the damaged section (e.g., the damaged volume) of the core 13 are removed, providing an open volume (e.g., an open repair volume) 110 open to the outside through an opening in the first facesheet 11. Often, the damaged area and, therefore, the open volume 110 will have an irregular shape. Different from the related-art "drill and fill" repair method, the method of repairing the damaged sandwich structure according to embodiments of the present disclosure may easily fill irregularly-shaped volumes.

Next, referring to FIG. 3B, the open volume 110 is sealed against fluid efflux (e.g. is fluidly sealed) by a sealant 115, such as a polymer film, a metal foil, a composite ply, etc. In some embodiments, the sealant 115 may be adhered to the exposed undamaged core 13 along a periphery of the open volume 110 by an adhesive, such as by a pressure-sensitive adhesive ("PSA") and/or a foaming adhesive. In other embodiments, however, no adhesive may be used between the sealant 115 and the undamaged core 13. Further, the sealant 115 may be sealed against the undamaged second facesheet 12 by, for example, a UV-curable resin, film adhesive, liquid adhesive, etc. Thus, the open volume 110 is made to be liquid-tight such that a sealed repair volume 111 is provided, which may retain a liquid therein without the liquid escaping into the core 13.

Referring to FIG. 3C, the sealed repair volume 111 is then filled with (e.g., is entirely filled with) an ultraviolet-curable ("UV-curable") photomonomer 120. Some examples of the UV-curable photomonomer 120 include, but are not limited to, thiols, -enes, acrylates, methacrylates, urethane acrylates, epoxies, etc. A mask (e.g., a mask layer) 125 is then placed on the damaged first facesheet 11 to extend over the sealed repair volume 111 and the UV-curable photomonomer 120 in the sealed repair volume 111. For example, the mask 125 may be placed on the damaged first facesheet 11 to extend over the sealed repair volume 111 where the UV-curable photomonomer 120 is contained.

The mask 125 has a regular or irregular pattern of UV-transparent apertures 126 formed therein. The UV-transparent apertures 126 may be, for example, openings extending through the mask 125 or may be areas of UV-transparent material, such as acrylic and/or glass in the mask 125.

In some embodiments, a UV-transparent spacer, such as acrylic, glass, and/or a photomonomer without an initiator (e.g., without a photoinitiator), may be placed between the UV-curable photomonomer 120 in the sealed repair volume 111 and the mask 125 to control the height of the repaired core section and/or the shape of the repaired core section as well as to improve the releasability of the mask 125 from the cured photomonomer. Similarly, when the damaged section of the sandwich structure to be repaired has a three-dimensional curvature, a second volume of photomonomer may be placed over the UV-curable photomonomer 120 to act as a UV-transparent spacer to provide a relatively flat surface on which the mask 125 can be arranged. The second volume of photomonomer may not include an initiator (e.g., may not include a photoinitiator) such that, when the second volume of photomonomer and the UV-curable photomonomer 120 are both exposed to a UV-light source, further discussed below, only the UV-curable photomonomer 120 is cured while the second volume of photomonomer is not cured. In some embodiments, the photomonomer 120 and the second volume of photomonomer may include at least some of the same materials, with the photomonomer 120 including a photoinitiator while the second volume of photomonomer does not include a photoinitiator.

Then, referring to FIGS. 3D and 3E, the UV-curable photomonomer 120 is exposed to collimated ultraviolet light ("UV light") 130 through the apertures 126 in the mask 125 to form photopolymer waveguides (e.g., self-propagating photopolymer waveguides) 135 in the photomonomer 120. To control the extension direction of the photopolymer waveguides 135, a plurality of collimated UV light sources may be arranged at different orientations over the mask 125 to provide the UV light 130 to the apertures 126 at certain angles. In some embodiments, the photopolymer waveguides 135 may extend at about a 60° angle with respect to the mask 125 and may have a diameter in a range of about 100 μm to about 1 cm, but the present disclosure is not limited thereto.

Based on the orientation of the collimated UV light sources and the apertures 126 in the mask 125, the photopolymer waveguides 135 are formed in the UV-curable photomonomer 120 due to a change in the local index of refraction in the photomonomer 120, which causes a self-focusing effect to form linear photopolymer waveguides 135 that extend until the UV light 130 either reaches a non-reflecting boundary (e.g., the second facesheet 12) or the intensity of the UV light 130 is no longer sufficient to further polymerize the UV-curable photomonomer 120. Generally, the UV light 130 may have sufficient intensity to polymerize about 1.25 inches of UV-curable photomonomer 120, but the present disclosure is not limited thereto. The confluence of the photopolymer waveguides 135 forms a three-dimensional truss or lattice structure (e.g., a microtruss) within the core 13. Because the photopolymer waveguides 135 are formed within the damaged portion of the core 13 (e.g., within the sealed repair volume 111), this repair method may be referred to an in situ repair method.

Referring to FIG. 3F, the mask 125 is removed and the unused (e.g., uncured) photomonomer 120 is removed (e.g., drained) from the sealed repair volume 111. The unused photomonomer 120 may be reused in a later repair process, thereby increasing the efficiency of this process. At this stage, the photopolymer waveguides 135 are in a partially-cured state (also referred to as a "green" state), and then, a relatively high intensity non-collimated UV light 140 is exposed to the photopolymer waveguides 135 to fully cure (e.g., to cross-link) the photopolymer waveguides 135, thereby forming the cured photopolymer trusses 145. In some embodiments, instead of the high intensity non-collimated UV light 140, a thermal curing process may be used to fully cure the photopolymer waveguides 135 to form the cured photopolymer trusses 145. The thermal-curing process may include heating to a range of about 120° C. to about 160° C. for about 2 to about 8 hours, but the present invention is not limited thereto.

In FIG. 3F, the arrangement of photopolymer trusses 145 is shown as having a different arrangement of trusses than the core 13. For example, the core 13 may have trusses that have a different diameter than (e.g., smaller than) the photopolymer trusses 145, are arranged nearer to each other than the photopolymer trusses 145, and/or intersect each other more times than the photopolymer trusses 145. Thus, under the opening in the first facesheet 11 at where the damaged portion was removed, the photopolymer trusses 145 may have different characteristics than the trusses of the core 13 owing to the repair method.

Figure 4A:
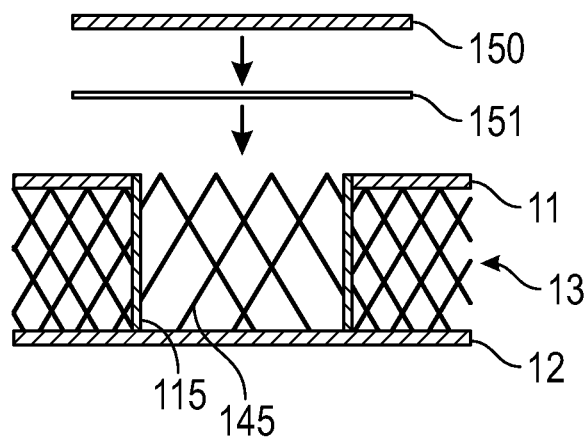
FIGS. 4A-4C show different methods of repairing a damaged first facesheet of a damaged sandwich structure according to embodiments of the present disclosure.
Figure 4B:
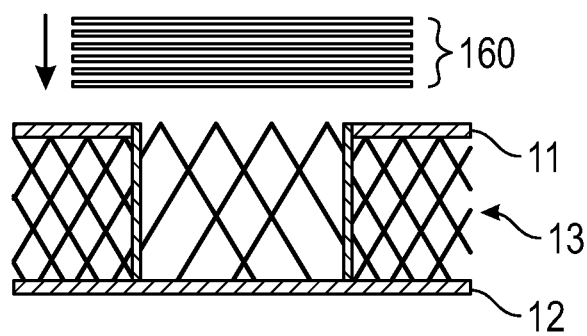
Figure 4C:
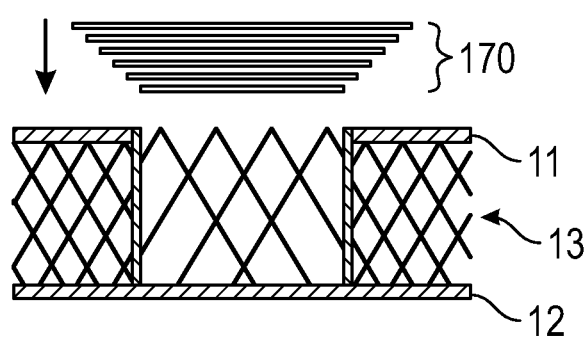

After the photopolymer trusses 145 are formed, the first facesheet 11 is repaired. Referring to FIGS. 4A-4C, different methods of repairing the first facesheet 11 are illustrated. For example, in FIG. 4A, a pre-cured composite facesheet 150 may be adhered to the repaired section of the core 13 (e.g., the trusses 145) and to the undamaged portion of the first facesheet 11 by an adhesive 151. The pre-cured composite facesheet 150 may extend over the repaired section of the core 13 and onto the existing, undamaged first facesheet 11 to provide a secure bond between the pre-cured composite facesheet 150 and the repaired sandwich structure. Referring to FIG. 4B, a plurality of composite plies 160 may be placed over the repaired section of the core 13 and the undamaged portion of the first facesheet 11 and cured in place by, for example, thermal curing. In the method of in-place curing of the composite plies 160 shown in, for example, FIG. 4B, the adhesive 151 may be omitted. FIG. 4C shows a repair method similar to that shown in FIG. 4B but, in FIG. 4C, the plurality of composite plies (e.g., composite layers) 170 may have a scarf (e.g., the composite plies 170 may have increasing lengths in a direction away from the repaired section of the core 13) so that the composite plies 170 fit more closely to the repaired section of the core 13 (e.g., to trusses 145). Then, the composite plies 170 may be cured in place as described with respect to FIG. 4B.

In the in-place curing methods shown in FIGS. 4B and 4C, the green photopolymer waveguides 135 and the composite plies 160/170 may be co-cured (e.g., may be cured by using the same process and/or at the same time). For example, a thermal curing process may be used to cure the photopolymer waveguides 135 to form the trusses 145 and to cure the composite plies 160/170 to form the repaired first facesheet 11.

The above-described in situ repair method is net-shape (e.g., is in its final shape such that no post-shaping, forming, deforming, etc. is necessary) and, thus, can fill a damaged volume having any shape without having to, for example, remove additional, undamaged material to form a rectangular repair volume, which is typically done when foam or honeycomb reinforcement repairs are contemplated by using the related-art drill and fill repair method. Additionally, using the high intensity non-collimated UV light 140 to cure the photopolymer waveguides 135 provides a more cost-efficient repair for relatively large (e.g. rotor blades) or precise (automotive body panels) parts when compared to thermal curing because the non-collimated UV light 140 may be applied locally. The use of photopolymer waveguides 135 also enables local reinforcement in selected regions of the repair patch. That is, because the geometry and architecture of the repaired core section is dictated by the size, spacing, and arrangement of the apertures 126 in the mask 125 and the arrangement of the UV light sources above the mask 125, the size, spacing, arrangement, etc. of the photopolymer waveguides 135 may be suitably varied to increase stiffness or strength in critical regions of the repaired volume, such as at the boundaries between the repaired volume and the pre-existing undamaged material.

Referring to FIGS. 5A-5E, a method of repairing single-sided damage to a sandwich structure 100 according to another embodiment of the present disclosure is illustrated. Different from the embodiment shown in FIGS. 3A-3F, in the embodiment shown in FIGS. 5A-5E, a replacement truss structure 200 is formed separately from the damaged sandwich structure 100 and is then affixed to the damaged sandwich structure 100.

Referring to FIG. 5A, the replacement truss structure 200 is formed by forming a mold 210 on a replacement facesheet 205. An area between the mold 210 and the replacement facesheet 205 is a sealed repair volume 211. The size and shape of the replacement facesheet 205 and the sealed repair volume 211 may be formed to match or substantially match (e.g., may be slightly larger than) the damaged volume (e.g., the open repair volume 110) in the damaged sandwich structure 100 (see, e.g., FIG. 5D). In some instances, the sealed repair volume 211 may be slightly larger than the damaged volume, and the apertures 226 in the mask 225, described further below, may be formed to correspond to the dimensions of the damaged volume or may extend slightly beyond the dimensions of the damaged volume.

The method of forming the replacement truss structure 200 according to this embodiment is substantially similar to the method of forming the trusses 145 shown in FIGS. 3B-3F. For example, Referring to FIG. 5A, the mold 210 is formed by, for example, a polymer film, a metal foil, a composite ply, or other suitable thin and stiff material. The mold 210 may be adhered (e.g., removably adhered) to the replacement facesheet 205 by, for example, a UV-curable resin, a film adhesive, a liquid adhesive, or other suitable barrier seal material, thereby forming a liquid-tight repair volume 211 in which the volume of photomonomer 120 is filled. Then, the mask 225, which has a plurality of UV-transparent apertures 226 formed therein, is placed over the volume of photomonomer 120.

Referring to FIG. 5B, collimated UV light 130 from a plurality of UV light sources is exposed to the volume of photomonomer 120 through the apertures 226 of the mask 225, thereby forming photopolymer waveguides 135. The photopolymer waveguides 135 are formed on and, therefore, bond to the replacement facesheet 205 without using an adhesive. However, in some embodiments, an adhesive may be used between the photopolymer waveguides 135 and the replacement facesheet 205.

Referring to FIG. 5C, the unused photomonomer 120 is removed (e.g., is drained) from within the sealed repair volume 211, and then the mold 210 is removed from the replacement facesheet 205. In other embodiments, the mold 210 may be removed before the unused photomonomer 120 is removed.

Then, referring to FIG. 5D, the replacement truss structure 200, including the replacement facesheet 205 and the photopolymer waveguides 135, is provided to the damaged sandwich structure 100, from which the damaged volume was previously removed to provide the open volume 110. Here, the photopolymer waveguides 135 are inserted into the open volume 110 and the replacement facesheet 205 is set on the first facesheet 11. Because the photopolymer waveguides 135 are only partially cured at this stage, they conform to the shape of the open volume 110. For example, the photopolymer waveguides 135 may extend slightly beyond the edge of the open volume 110 such that, when the photopolymer waveguides 135 are inserted into the open volume 110, they bend and compress to entirely fill the open volume 110 without a gap between the photopolymer waveguides 135 and the undamaged core 13. Because the photopolymer waveguides 135 are inserted into the open volume 110 when they are in a green, or partially cured state, this repair method may be referred to as the "green state" repair method.

Referring to FIG. 5E, the photopolymer waveguides 135 are cured by, for example, exposure to a high-intensity non-collimated UV light or by thermal curing. In this embodiment, if neither the replacement facesheet 205 nor the undamaged facesheet 12 is UV-transparent, then the thermal curing may be used. The UV or thermal curing may also cause the replacement facesheet 205 to be bonded to the existing undamaged portion of the first facesheet 11. In some embodiments, an adhesive may be used between the facesheet 11 and the replacement facesheet 205, similar to the adhesive 151 shown in FIG. 4A.

In FIG. 5E, an optional film adhesive 215 is shown between the trusses 145 and the undamaged core 13 and the undamaged facesheet 12, but the adhesive 215 is optional and may be omitted. When the adhesive 215 is included, it is applied to the periphery of the undamaged core 13 and onto the undamaged facesheet 12 prior to the replacement truss structure 200 being provided to the damaged sandwich structure 100.

Referring to FIGS. 6A-6E, a method of repairing single-sided damage to a sandwich structure 100 by using a replacement truss structure 300 according to another embodiment of the present disclosure is illustrated. Different from the embodiment shown in FIGS. 5A-5E, in the embodiment shown in FIGS. 6A-6E, the photopolymer waveguides 135 of the replacement truss structure 300 are fully cured by, for example, exposure to high intensity non-collimated UV light 140 prior to being affixed to the damaged sandwich structure 100. Because the photopolymer waveguides 135 are fully cured to form the trusses 145 before they are inserted into the damaged sandwich structure 100, this repair method may be referred to as the "bond-in" repair method.

The acts illustrated in FIGS. 6A and 6B are substantially similar to the acts illustrated in FIGS. 5A and 5B, respectively, and as such, a repeat description thereof may be omitted.

Referring to FIG. 6C, after the photopolymer waveguides 135 are formed by exposure to the collimated UV light 130, the photopolymer waveguides 135 are cured to form the trusses 145 by exposing the photopolymer waveguides 135 to relatively high intensity non-collimated UV light 140. As described above, the photopolymer waveguides 135 may also be cured to form the trusses 145 by a thermal curing process.

Referring to FIG. 6D, the replacement facesheet 205 with the cured trusses 145 formed thereon is provided to the damaged sandwich structure 100. For example, the trusses 145 are inserted into the open volume 110 of the damaged sandwich structure 100 and the replacement facesheet 205 is set on the first facesheet 11. The adhesive 215, such as a UV-curable adhesive, core splice adhesive, or foaming adhesive, is applied to the periphery of the trusses 145 and/or to the periphery of the open volume 110 (e.g., to the exposed portion of the undamaged core 13 and to the undamaged facesheet 12) prior to the replacement truss structure 300 being inserted into the damaged sandwich structure 100. Also, an adhesive, similar to the adhesive 151, may be applied between the replacement facesheet 205 and the first facesheet 11.

FIG. 6E shows the repaired sandwich structure 350 in which the trusses 145 are adhered to the undamaged core 13 by the adhesive 215.

Figure 7A:
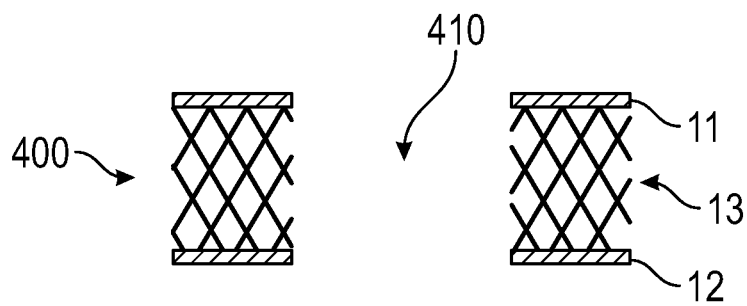
FIGS. 7A-7C show a method of repairing a damaged second facesheet according to an embodiment of the present disclosure.
Figure 7B:
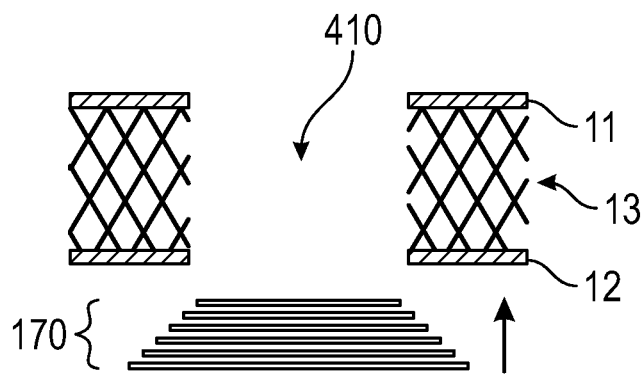
Figure 7C:
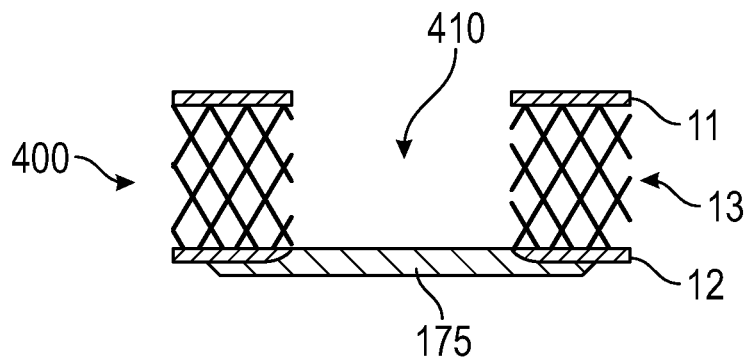

FIGS. 7A-7C show a method of repairing a damaged facesheet according to an embodiment of the present disclosure. When a sandwich structure suffers double-sided damage, portions of both facesheets 11/12 must be replaced, along with replacement of the damaged core section.

Referring to FIG. 7A, a sandwich structure 400 having suffered double-sided damage is shown. First, the damaged portions of both facesheets 11/12 and the damaged portion of the core 13 are removed, thereby providing an open volume 410.

Referring to FIG. 7B, a plurality of composite plies (e.g., composite layers) 170 are applied to the second facesheet 12 (e.g., to close one end of the open volume 410 at the damaged portion of the second facesheet 12). For example, the composite plies 170 extend over the damaged portion of the second facesheet 12. The composite plies 170 were previously described with respect to FIG. 4C and, therefore, a repeat description thereof may be omitted. In other embodiments, the damaged second facesheet 12 may be repaired by using, for example, a pre-cured composite facesheet 150 adhered to the undamaged second facesheet 12 as described with reference to FIG. 4A or by using a plurality of composite plies 160 having the same length as each other as described with reference to FIG. 4B. In FIG. 7C, the composite plies 170 are shown as being cured into a composite facesheet 175, thereby adhering to the second facesheet 12 and closing (e.g., sealing) an end of the open volume 410.

After the second facesheet 12 is repaired according to one of the above-described embodiments, any of the above-described methods for repairing single-sided damage to the sandwich structure 100, including the in situ repair method, the green state repair method, and the bond-in repair method, may be used to repair the damaged sandwich structure 400.

Figure 8A:
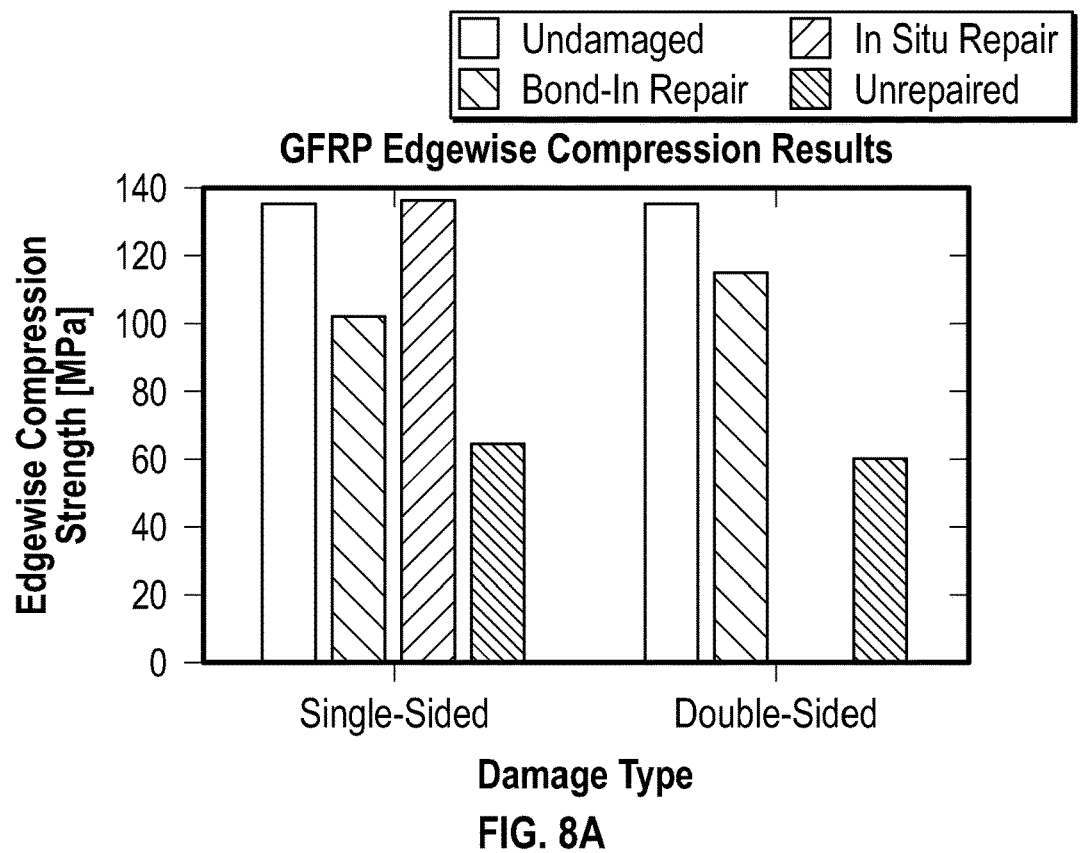
FIGS. 8A and 8B are graphs comparing edgewise compression strength of undamaged sandwich structures with sandwich structures repaired according to embodiments of the present disclosure.
Figure 8B:
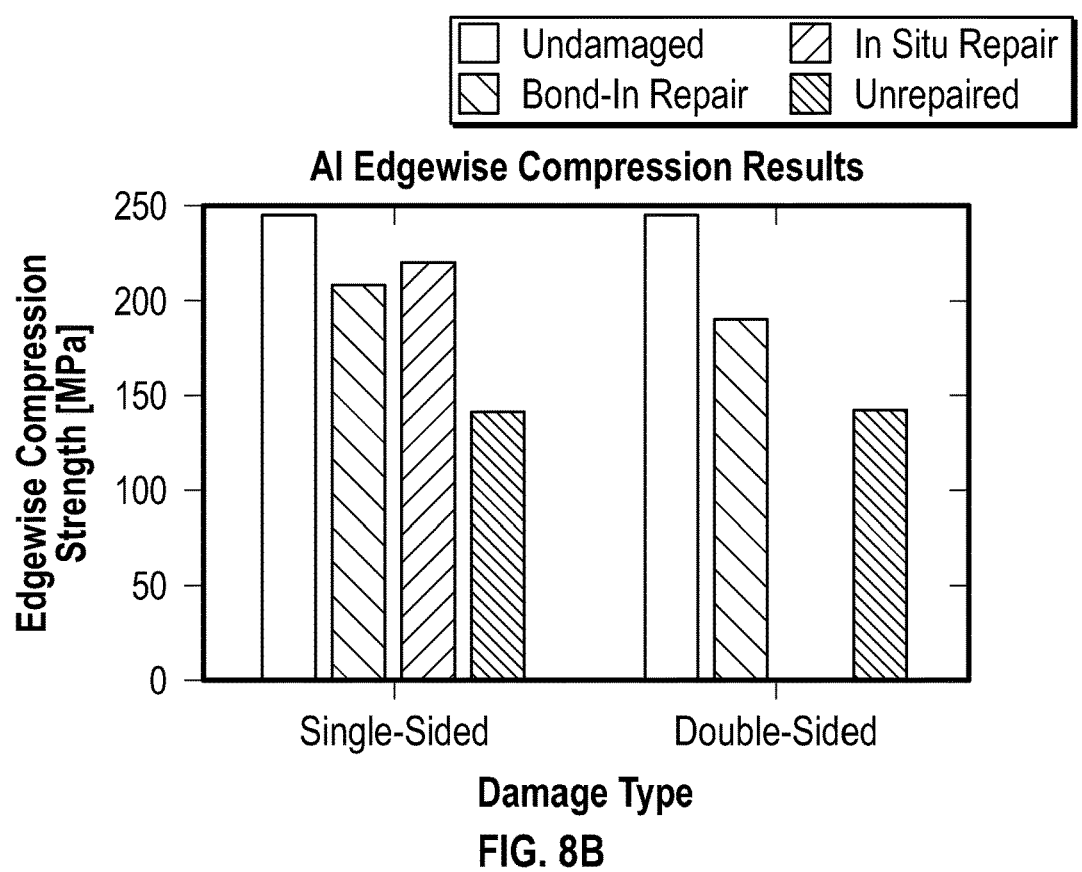

FIGS. 8A and 8B show the edgewise compression strength of sandwich structures repaired according to the in situ and bond-in repair methods compared to an undamaged sandwich structure and a damaged but unrepaired sandwich structure.

Referring to FIG. 8A, the test sample included a 12.7 mm thick polymer lattice core with two 0.8 mm 6061-T6 aluminum facesheets. The aluminum facesheets were adhered to the lattice core by an adhesive film. Referring to FIG. 8B, the test sample included a 12.7 mm thick polymer lattice core with two 1.6 mm quasi-isotropic glass fiber reinforced polymer composite facesheets. The composite facesheets were adhered to the lattice core by an adhesive film. Each sample was tested under standard impact conditions using a Lansmont M023 drop-weight impact tower fitted with a 19 mm diameter hardened steel hemispherical impactor. The impactor drop heights were adjust to cause single-sided and double-sided damage.

Referring to FIGS. 8A and 8B, it can be seen that sandwich structures repaired by using the in situ repair method described above with respect to FIGS. 3A-3F approaches the strength of the undamaged test samples, while the sandwich structures repaired by using the bond-in repair method described above with respect to FIGS. 6A-6E provides a substantial improvement in strength compared to the damaged but unrepaired test samples. Thus, both the in situ and the bond-in repair methods are effective at repairing damaged sandwich structures such that the repaired sandwich structures substantially retain their residual load-carrying capacity.

Figure 9:
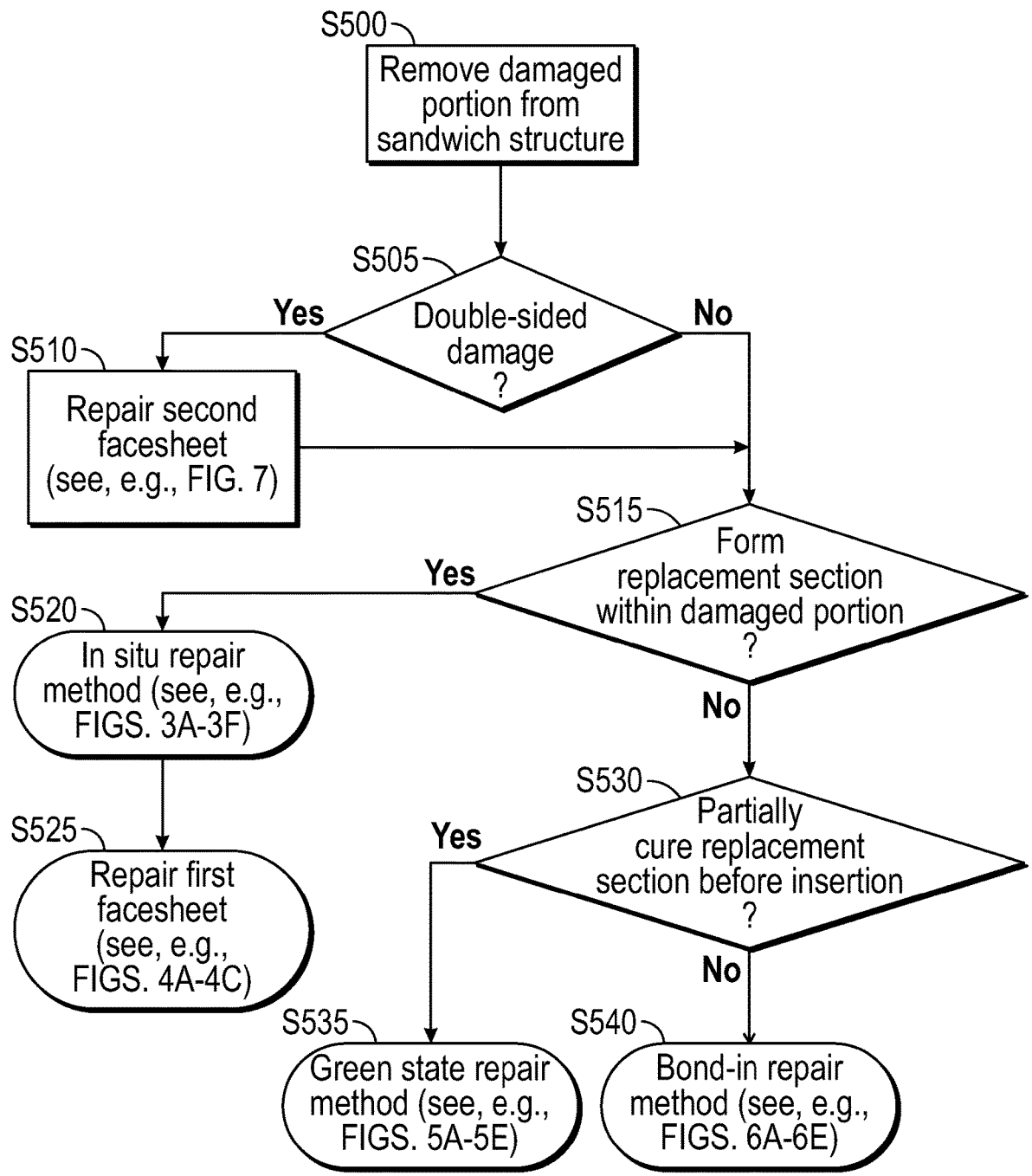
FIG. 9 is a flowchart illustrating aspects of embodiments of the present disclosure.

FIG. 9 is a flowchart is illustrating the repair methods according to embodiments of the present disclosure.

Referring to FIG. 9, first, the damaged portion (e.g., the damaged volume) is removed from the sandwich structure 100 (S500). The damaged portion includes the damaged portion of the first facesheet, the damaged portion (e.g., the damaged volume) of the core 13, and when the sandwich structure has suffered double-sided damage (S505), the damaged portion of the second facesheet 12.

When the sandwich structure 100 has suffered double-sided damage, the second facesheet 12 is repaired (S510). When the sandwich structure 100 has suffered single-sided damage or after the second facesheet 12 is repaired (S510), then it is determined if the replacement second is to be formed within the excised damaged portion (S515). If yes, then the in situ repair method is effected (S520), followed by repairing the first facesheet 11 (S525). If no, then it is determined if the replacement section is to be partially cured prior to insertion in the excised damaged portion (S530). If yes, the green state repair method is effected (S535). If no, the bond-in repair method is effected (S540).

It will be understood that, although the terms "first", "second", "third", etc., may be used herein to describe various elements, components, regions, layers and/or sections, these elements, components, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the terms "exemplary" and "example" are intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although example embodiments of a method of repairing a sandwich structure and a repaired sandwich structure have been described and illustrated herein, many modifications and variations within those embodiments will be apparent to those skilled in the art. Accordingly, it is to be understood that a method of repairing a sandwich structure and a repaired sandwich structure according to the present disclosure may be embodied in forms other than as described herein without departing from the spirit and scope of the present disclosure. The present disclosure is defined by the following claims and equivalents thereof.

What is claimed is:

1. A method of repairing a sandwich structure, the sandwich structure comprising a first facesheet, a second facesheet, and a core between the first and second facesheets, the method comprising:
    forming a repair volume in the sandwich structure by removing a damaged portion of the first facesheet and a damaged portion of the core;
    forming a mold on a replacement facesheet, the mold and the replacement facesheet forming an open volume;
    filling the open volume with an ultraviolet-curable photomonomer;
    forming a plurality of photopolymer waveguides by partially curing the ultraviolet-curable photomonomer; and
    inserting the photopolymer waveguides into the repair volume in the sandwich structure.

2. The method of claim 1, further comprising arranging a mask on an upper surface of the mold and over the ultraviolet-curable photomonomer, the mask comprising a plurality of ultraviolet-transparent apertures,
    wherein the forming of the photopolymer waveguides comprises exposing collimated ultraviolet light through the ultraviolet-transparent apertures in the mask.

3. The method of claim 2, further comprising curing the photopolymer waveguides after the inserting of the photopolymer waveguides into the repair volume.

4. The method of claim 3, wherein the curing of the photopolymer waveguides comprises thermally curing the photopolymer waveguides.

5. The method of claim 2, further comprising curing the photopolymer waveguides before the inserting of the photopolymer waveguides into the repair volume.

6. The method of claim 5, wherein the curing of the photopolymer waveguides comprises exposing the photopolymer waveguides to non-collimated ultraviolet light.

7. The method of claim 1, further comprising adhering the replacement facesheet to the first facesheet.

* * * * *